J. H. MAXWELL.
TRAP.
APPLICATION FILED NOV. 18, 1912.

1,071,678.

Patented Aug. 26, 1913.

WITNESSES.
C. M. Anderson.
Nils Johnson.

INVENTOR,
James H. Maxwell.
By Henry L. Reynolds,
Attorney.

COLUMBIA PLANOGRAPH CO., WASHINGTON, D. C.

UNITED STATES PATENT OFFICE.

JAMES H. MAXWELL, OF SEATTLE, WASHINGTON.

TRAP.

1,071,678.  Specification of Letters Patent. Patented Aug. 26, 1913.

Application filed November 18, 1912. Serial No. 732,175.

*To all whom it may concern:*

Be it known that I, JAMES H. MAXWELL, a citizen of the United States, and resident of the city of Seattle, in the county of King and State of Washington, have invented certain new and useful Improvements in Traps, of which the following is a specification.

My invention relates to traps and comprises certain novel constructions and combinations which will be hereinafter described and particularly pointed out in the claims.

The object of my invention is to provide a better and more efficient trap and one which will be more likely to catch the wary animals and those which are hard to get in the usual types of traps.

In the accompanying drawings I have shown my invention embodied in the forms which are now preferred by me.

Figure 1:
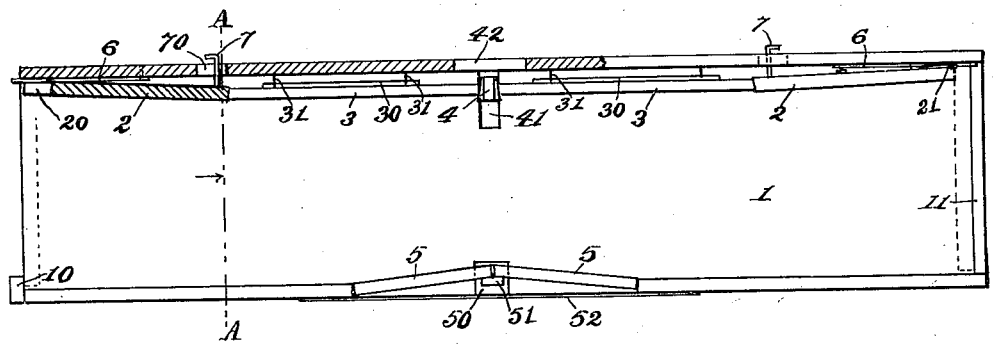
Figure 2:
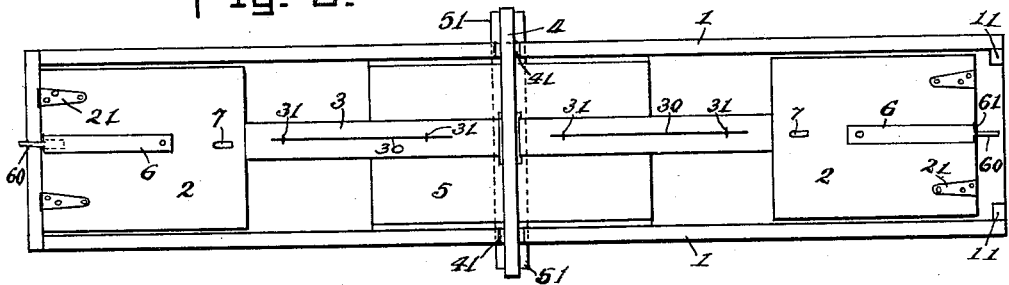
Figure 3:
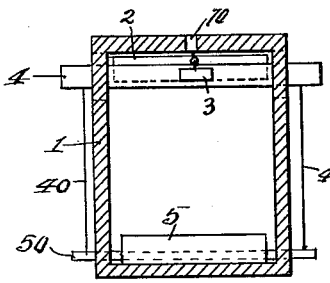
Figure 4:
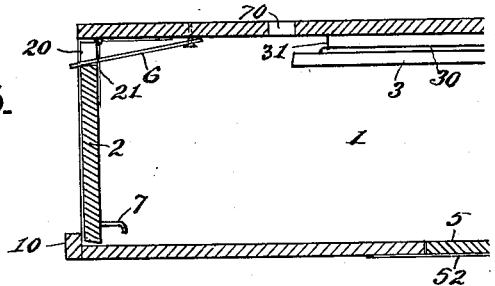
Figure 5:
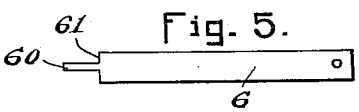

Figure 1 is a side elevation of the trap with the near side wall removed to show the inner construction and with a part of the top wall in section, the trap being set. Fig. 2 is a top plan view with the cover removed. Fig. 3 is a section on the line A, A, of Fig. 1. Fig. 4 is a vertical longitudinal section of one end of the trap with the door closed. Fig. 5 is a separate view of the door locking bar.

The body of this trap is constructed as a box 1, having its ends open to form a through passage or runway which may be closed by doors 2 at each end thereof. The doors are preferably hinged by their upper edges so as to swing upward and inward into the position shown in Fig. 1 when the trap is set. In this position the trap constitutes a through runway, into which a wary animal is more apt to venture than into a box having only one opening.

Means are provided to prevent the door swinging outward beyond the closed position, said means as shown consisting of a strip 10 at the bottom of the box or strips 11, one at each side of the opening, as shown at one end of the trap. Means for locking the doors in closed position are also provided. The means shown consist in providing the upper or hinged edges of the doors with a transverse notch 20 and a locking bar 6 to coöperate therewith. The locking bar has a hole near its inner end through which a nail may be placed to secure it loosely to the roof of the trap. Its outer or door-engaging end has a reduced finger 60, thus forming shoulders 61. The bar is secured in such position that the finger is in position to drop into the notch 20 in the door when the door is closed and the shoulders 61 to engage the inner surface of the door and prevent its being opened. This position is shown in Fig. 4. The finger 60 projects enough that it may be engaged from the outside to raise the bar and free the door.

The means for setting the trap and for holding the doors in raised position are as follows: Secured to the top of the runway and extending lengthwise the runway, just inward from the doors, are two bars 3, so supported that they may have a limited movement lengthwise the runway. As herein shown each bar is provided with a wire staple 30 and this is engaged by two screw eyes 31 which depend from the top. The length of these door holding bars 3 are such that when their outer ends are against the inner edges of the doors, their inner ends are separated somewhat and are placed opposite. Between these opposed inner ends is then placed a trip member consisting, as herein shown, of a bar 4 which extends across the trap and projects its end through holes 41 in the sides of the trap body. The inner end surfaces of the bars 3, as well as the engaging surfaces of the trip bar 4, may be made slightly beveled, if desired, so that when the trip bar is inserted between the ends of the bars 3 it will force them outward against the ends of the doors 2 with sufficient pressure to overcome, by the friction of contact, the weight of the door. The trip bar 4 is supported wholly by the frictional grip of the ends of the bars 3, and this may be so adjusted that a very slight additional weight, or a little movement, will cause the disengagement of the trip bar and then the doors will be unsupported and fall.

The central portion of the bottom of the runway is formed by a plate or plates which are supported in raised position from the trip bar 4, so that when an animal gets to this point and steps on said plate the trap will be sprung and the doors closed. I have shown two boards 5 as lying within a recess in the bottom caused by removal of the central portion of the bottom of the box 1. Beneath the meeting edges of these boards 5 extends a bar 51, its ends projecting through holes 50 in the sides of the trap. The bars 4 and 51 are connected, as by wires 40 outside the box, so that the bar 51 and the trip plates 5 are supported from the trip bar 4. The opening caused by the removal of a section of the bottom is preferably closed by a sheet of metal, 52. Where the animal sought to be caught is capable of gnawing wood, the interior of the box may be lined with metal plates.

As a convenience in setting the trap, the doors are provided with means whereby they may be held raised while setting. The means shown consists of a hook 7 which projects through hole 70 in the top, beneath which hook may be placed a stick or any convenient small object, this to be removed after the trap is set. The top is also provided with a hole 42 over the trip bar, whereby the setting of the parts may be facilitated.

What I claim as my invention is;

1. In a trap, in combination, a box having an entrance opening, a door hinged at its upper edge to close said opening, a door-holding member supported from the top of said box and movable toward and from the door and adapted to support the door when raised by the friction of its thrust engagement with the edge surface of the door, a trip member adapted to engage the other end surface of said door-holding member to force it toward the door and supported in position by the friction of said thrust engagement, and a trip plate supported from said trip member and forming a part of the runway floor.

2. In a trap, in combination, a body forming a through runway, doors closing the ends of said runway and swinging inward, two longitudinally movable door-holding bars, each in position to engage an end surface thereof with an edge surface of its respective door to hold the doors open by the friction produced by its end thrust, a trip member adapted to be inserted between the adjacent end surfaces of said door-holding bars to thrust them apart, and supported by the friction produced by said thrust, a trip plate forming a section of the runway floor and means for supporting said trip plate from said trip member.

3. In a trap, in combination, a box-like body having open ends and forming a through runway, doors hinged by their upper edges to close said runway and to swing upward and inward, means preventing said doors swinging outward, locks adapted to engage said doors to hold them when closed, a setting catch for each door, door holding members comprising two alined bars extending and supported to move lengthwise said runway with an end of each in position to engage the edge surface of its respective door when raised and with their other ends opposed, a tripping or releasing member insertible between the opposed end surfaces of said bars to force them outward against the doors, a trip plate in the bottom of said runway and means for supporting said trip plate in raised position from said releasing member.

4. A trap comprising a body in the shape of a box having opposite ends open to form a through runway, a door for closing each end of the runway, means for locking said doors when closed, means for holding said doors in opened position comprising members movable lengthwise said runway and with opposed and adjacent ends, a trip bar insertible between the ends of said members and held in place by the friction produced by the thrust thereof, a trip plate in the bottom of the runway and supporting connections for said plate from the trip bar.

5. A trip device for traps comprising a trip member, a support for the trip member having opposed surfaces between which the trip member is placed and supported by the friction of its thrust engagement therewith, a trip plate and connections therefrom to the trip member adapted to hold said trip plate raised when the trip member is in set position.

6. In a trap, in combination, a body forming a through runway, doors hinged at the ends of said runway to swing upward and inward, said doors having a transverse notch in their hinged edges, a door locking bar having a finger adapted to pass through said notch and shoulders adapted to engage the face of the door at the sides of the notch, and means for loosely supporting the inner end of said bar with the shoulders of the other end in position to engage the face of the door and the finger to enter the notch.

In testimony whereof I have hereunto affixed my signature at Seattle, Washington, this 31st day of October, 1912.

JAMES H. MAXWELL.

Witnesses:
H. L. REYNOLDS,
FRED W. DRICKEN.

Copies of this patent may be obtained for five cents each, by addressing the "Commissioner of Patents, Washington, D. C."